United States Patent [19]

Wheeler

[11] 4,020,958

[45] May 3, 1977

[54] BULK MATERIAL CONTAINER LOADING AND SYSTEM

[76] Inventor: Robert R. Wheeler, 7615 Shady Oak Drive, Downey, Calif. 90240

[22] Filed: Dec. 6, 1974

[21] Appl. No.: 530,195

Related U.S. Application Data

[63] Continuation of Ser. No. 312,596, Dec. 6, 1972, abandoned.

[52] U.S. Cl. .............................. 214/41 R; 214/517; 141/392
[51] Int. Cl.[2] ......................................... B65G 67/10
[58] Field of Search .......... 141/231, 232, 252, 233, 141/392, 391; 214/16 R, 517, 17 C, 17 CA, 41

[56] References Cited

UNITED STATES PATENTS 2,194,144  3/1940  Gill .................................. 214/17 C Primary Examiner—Houston S. Bell, Jr.

[57] ABSTRACT

A bulk materials handling system comprises:

a. a housing forming a zone to receive an upwardly open container adapted to be moved into position in the housing to be filled with said material and thereafter to be removed from the housing for transport, b. material supply means defining an outlet for gravity flow of the material to fill a localized portion of the container and there being a materials conveyor openly overlying said zone and directed to spread the material filling said container portion up to the level of the conveyor so that the spread material will fill other portions of the container.

5 Claims, 5 Drawing Figures

U.S. Patent May 3, 1977 4,020,958

BULK MATERIAL CONTAINER LOADING AND SYSTEM

This is a continuation, of application Ser. No. 312,596, filed Dec. 6, 1972, now abandoned.

BACKGROUND OF THE INVENTION

This invention relates generally to the handling of bulk materials, and more particularly concerns rapid, dust-contained loading of such materials into portable containers or bins which may subsequently be loaded onto vehicles such as trucks for transport.

The loading of bulk material into containers creates extremely dusty conditions, which is a continual problem from the standpoint of waste and unhealthful conditions for personnel. Examples of such material include wood chips, grain, hay, ground materials and dry particulates of many types. Prior methods of loading of such materials, do not, to my knowledge, incorporate the unusual advantages in structure, mode of operation and results afforded by the present invention.

SUMMARY OF THE INVENTION

Basically, a bulk materials handling system incorporating the invention comprises:

a. a housing forming a zone to receive an upwardly open container adapted to be moved into position in the housing to be filled with said material and thereafter to be removed from the housing for transport.

b. material supply means defining an outlet for gravity flow of the material to fill a localized portion of the container and there being a materials conveyor openly overlying said zone and directed to spread the material filling said container portion up to the level of the conveyor so that the spread material will fill other portions of the container.

As will be seen, the conveyor may comprise a screw flight type conveyor extending generally horizontally above the level of the container zone in the housing, with a portion of the conveyor in the path of bulk material gravitating from the outlet; alternatively, the conveyor may comprise a chain conveyor.

Other objects include the provision of a dust housing forming multiple container zones as described: the provision of guide means such as tracks for guiding the container movement into and out of the dust housing; the provision of a container having a hinged wall to be swung outwardly to allow utlimate discharge of the loaded bulk material; and the provision of a bulk materials pusher in the container; and, certain controls.

A further object of the invention is to provide a simple bulk materials loading process wherein dust creation and material wastage is minimized, in the manner to be described.

These and other objects and advantages of the invention, as well as the details of an illustrative embodiment, will be more fully understood from the following description and drawings, in which:

DRAWING DESCRIPTION

DETAILED DESCRIPTION

Figure 1:
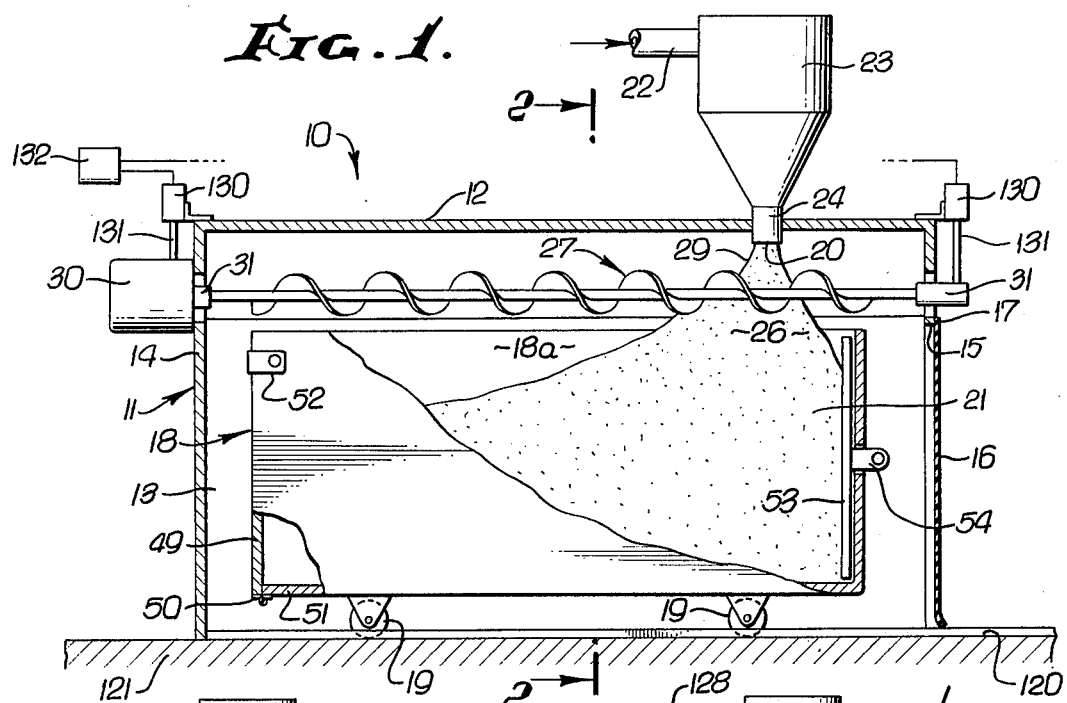
FIG. 1 is a side elevation, in section, showing one preferred form of the invention.
Figures 2, 4:
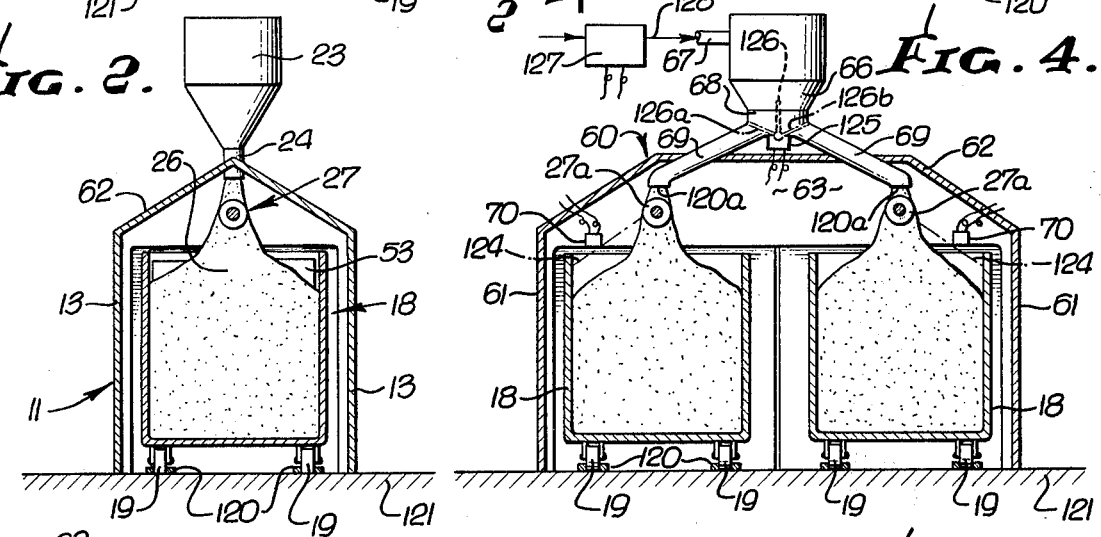
FIG. 2 is a vertical section taken on lines 2—2 of FIG. 1.
FIG. 4 is a view like FIG. 2, showing a modified form of the invention.

Referring first to FIGS. 1 and 2, the bulk material handling system 10 includes an elongated housing 11 comprising a roof 12, side walls 13, rear end wall 14 and a front opening 15. A flexible panel or sheet 16 hangs at 17 from the housing to close the front opening preventing excape of dust from the housing during the filling operation to be described.

The housing forms an interior zone to receive an upwardly open container 18 moved into the housing via the front opening 15 so as to be filled with bulk material. For this purpose, the container may be provided with support wheels 19 engaging guide means defining generally horizontal tracks. The latter may be formed as elongated recesses 120 in the base 121 supporting the housing, and extending to the front exterior of the housing to facilitate entrance and removal of the container.

Materials supply means is provided to define an outlet, as at 20, for gravity flow of the bulk material to fill a localized portion 21 of the container. Such supply means may include structure for pneumatically conveying the bulk material to fall through the outlet 20, and such structure may advantageously include a supply duct 22, cyclone separator 23, and outlet duct 24, extending downwardly at the housing roof.

Figure 5:
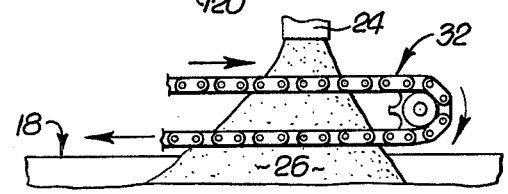
FIG. 5 is an elevation showing a modified form of the invention.

In accordance with an important aspect of the invention, a conveyor is provided to openly overlie the container 18 in the zone 18a, and to spread the material 26 filling the localized portion 21 of the container up to the level of the conveyor, and so that the spread material will be caused to fill other portions of the container. For example, as the bulk material fills the container portion 21 to form a mound at 26 at the level of the conveyor, the latter, which may for example comprise a screw conveyor 27, is operated to convey or spread the material tending to form that mound so that the remainder of the container is filled. This results in substantial reduction in dust formation inasmuch as the material is supplied to fall freely in only a very localized stream 29. A conveyor drive is shown at 30, and conveyor bearings at 31. Other types of elongated conveyors may be employed, as for example chain conveyors. An example of the latter is seen in FIG. 5 at 32.

Figure 3:
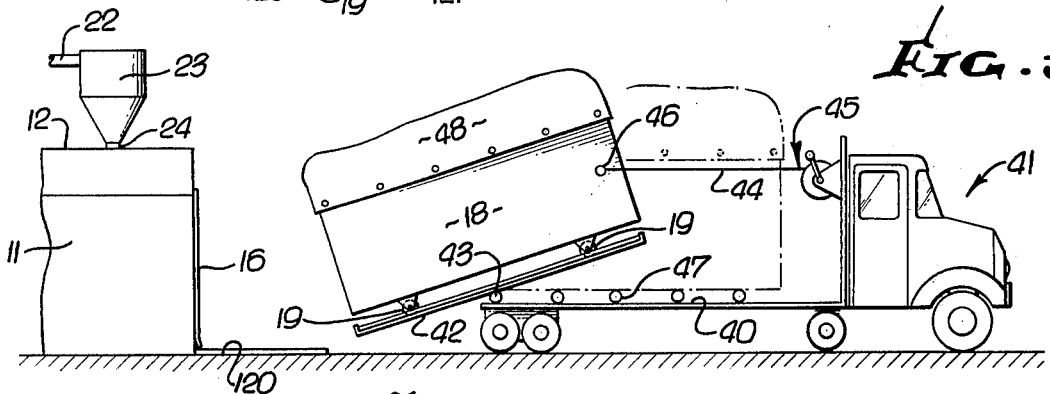
FIG. 3 is a side elevation.

FIG. 3 shows the manner in which the container 18 may be loaded onto the bed 40 of a truck 41. For this purpose, the container may be moved on guide ways 20 out of the housing 10 via the front opening 15 after removal of flexible panel 16. The container may then be hauled up a ramp 42 pivoted at 43 on the truck, a line 44 operated by winch 45 provided for this purpose. Note that the line may be suitably connected to the container as at 46. Ultimately, the ramp pivots downwardly onto the truck bed and moves to forward position as on rollers 47. Note that a tarpaulin 48 may be attached to the container to cover the bulk material.

Referring back to FIG. 1, the container may have a rear wall 49 hinged at 50 to the container bottom 51 and adapted to be swung counterclockwise and downwardly after a latch 52 is released. Thereafter, bulk material may be pushed leftwardly from the container as by means of a plate 53. The pusher plate may be connected at 54 to a suitable ram, to displace the plate leftwardly.

Referring to FIG. 4, a modified housing 60 has side walls 61 and a roof 62, with interior space 63 sufficient to receive multiple containers 18 as previously described, there being horizontal tracks 20 as before, for guiding the container wheels 19. Screw conveyors 27a overlie the container, and function as described above in connection with conveyor 27. Bulk material is supplied via a separator 66 having an inlet 67 for air-conveyed material, and an outlet duct 68 fo the material to gravitate to the conveyors 27a via branch ducts 69.

Also shown in FIG. 4 is one form of control means for controlling the gravity flow of the materials to selectively fill the containers. As an example, level indicators are shown at 70 proximate the top levels of the container to provide signals when the materials at the far end of the container (relative to the outlets 120a) reach levels 124. If the materials in one container reach level 124 first, an operator 125 responds to the signal from the corresponding indicator to swing a butterfly valve 126 to one or the other of the positions 126a and 126b to close off gravity flow to that container and direct all flow to the yet unfilled container. After both fill levels 124 have been reached, the signals from both indicators may be employed to shut down a blower 127 supplying an air stream at 128 in which the materials are conveyed.

Referring back to FIG. 1, means is provided to effect bodily displacement of the horizontally extending conveyor 127 in a vertical direction, and relative to zone 18a, whereby higher or lower fill levels may be achieved. Such means may include the two drives 130 for actuators 131 to displace vertically the elements 30 and 31 previously described and to which the actuators are operatively connected as shown. An up-down control for the drives 130 is shown at 132.

I claim:
1. In a bulk material handling system, the combination comprising
  a. an upwardly open container and a housing forming a zone removably receiving the container to be moved into position in the housing to be filled with said material and thereafter to be removed from the housing for transport, the container supported on wheels,
  b. material supply means defining an outlet for gravity flow of the material to fill a localized portion of the container, and there being a generally horizontal materials conveyor everywhere directly and openly overlying said zone and being everywhere located openly above the container but closely spaced to the top level thereof to spread the material filling said container portion up to the level of the conveyor so that the spread material will fill other portions of the container, said outlet openly exposed downwardly through the conveyor to said zone therebeneath, the conveyor comprising a screw conveyor having an elongated generally horizontal shaft,
  c. a drive connected with the conveyor shaft to rotate same, and
  d. elevator means supporting the conveyor at opposite ends thereof and outside the container to elevate and lower the conveyor and its drive relative to the container and the housing, said elevator means being free of connection to and support by the container and connected to the conveyor at locations in alignment with the direction of travel of the container on said wheels.

2. The combination of claim 1 wherein the container has a wall portion that is displaceable to provide an outlet for removal of bulk material from the container, the container also having an attachment for a connector to bodily move the filled container onto a truck bed.

3. The combination of claim 1 including a second container as defined in claim 1 and a second conveyor as defined in claim 1, the housing forming a second zone receiving the second container directly beneath the second conveyor, said material supply means defining a second outlet directly overlying said second zone and openly exposed thereto.

4. The combination of claim 3 wherein said material supply means includes a material-gas separator, and separate conduits in communication with the separator and defining said outlets, there being means including level indicators responsive to materials levels in the containers to control flow of the materials in the conduits so that both the containers will be filled to predetermined levels.

5. The combination of claim 1 wherein said drive and elevator means are carried by the housing and located outside said zone.

* * * * *